(12) United States Patent
Li

(10) Patent No.: US 11,255,684 B2
(45) Date of Patent: Feb. 22, 2022

(54) SYSTEMS AND METHODS FOR ALLOCATING A SERVICE REQUEST

(71) Applicant: BEIJING DIDI INFINITY TECHNOLOGY AND DEVELOPMENT CO., LTD., Beijing (CN)

(72) Inventor: Junqin Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/221,710

(22) Filed: Apr. 2, 2021

(65) Prior Publication Data

US 2021/0247197 A1  Aug. 12, 2021

Related U.S. Application Data

(63) Continuation of application No. PCT/CN2018/114376, filed on Nov. 7, 2018.

(30) Foreign Application Priority Data

Nov. 6, 2018 (CN) .......................... 201811312638.3

(51) Int. Cl.
  *G01C 21/34* (2006.01)
  *G06Q 50/30* (2012.01)
  *G08G 1/00* (2006.01)

(52) U.S. Cl.
  CPC ......... *G01C 21/3438* (2013.01); *G06Q 50/30* (2013.01); *G08G 1/202* (2013.01)

(58) Field of Classification Search
  CPC ............ G01C 21/3438; G01C 21/3492; G01C 21/362; H04W 4/023; H04W 4/029; G08G 1/202; G06Q 50/30
  See application file for complete search history.

(56) References Cited

U.S. PATENT DOCUMENTS

2015/0016554 A1  1/2015  Swope et al.
2016/0232719 A1  8/2016  Brinig et al.
(Continued)

FOREIGN PATENT DOCUMENTS

CN  107767206 A  3/2018

OTHER PUBLICATIONS

International Search Report in PCT/CN2018/114376 dated Jun. 3, 2019, 4 pages.
(Continued)

*Primary Examiner* — Spencer D Patton
(74) *Attorney, Agent, or Firm* — Metis IP LLC

(57) ABSTRACT

A method for allocating a service request is provided. The method may include: receiving a service request from a terminal of a service requester, the service request being for a transport service and including a pick-up location and a drop-off location; determining a first service provider to provide the transport service; generating a first service order allocating the service request to the first service provider; receiving a request for navigation associated with the first service order at a second moment; generating route information based on a second location of the first service provider at the second moment and the pick-up location; determining whether to reallocate the service request to a second service provider based on the route information; further generating a second service order reallocating the service request to the second service provider; and transmitting signals to a terminal of the second service provider.

18 Claims, 9 Drawing Sheets

(56) References Cited

U.S. PATENT DOCUMENTS

| | | | |
|---|---|---|---|
| 2017/0034183 A1 | 2/2017 | Enqvist et al. | |
| 2018/0143034 A1 | 5/2018 | Zhang et al. | |
| 2018/0202818 A1 | 7/2018 | Zhang | |
| 2018/0245937 A1* | 8/2018 | Moore | G01C 21/3655 |
| 2018/0259351 A1 | 9/2018 | Broyles et al. | |
| 2019/0390971 A1* | 12/2019 | Shaginyan | G08G 1/096816 |

OTHER PUBLICATIONS

Written Opinion in PCT/CN2018/114376 dated Jun. 3, 2019, 4 pages.

"Didi's Brain Tells You What Happened Behind Every Order", Web page<http://www.cnetnews.com.cn/2017/0223/3089843.shtml>, Feb. 23, 2017.

"It Ain't Right !!!! Fight the Auto-reassign", Web page <https://uberpeople.net/threads/it-aint-right-fight-the-auto-reassign.113319/>, Oct. 24, 2016.

"Didi's Brain is Far Smarter Than AlphaGo, Ye Jieping Decrypts Didi's AI Path Planning", Web page<https://yq.aliyun.com/articles/177303>, Aug. 1, 2017.

"Order Allocation Strategy for Instant Delivery: From Modeling and Optimization", Web page<https://tech.meituan.com/O2O_Intelligent_distribution.html>, Oct. 11, 2017.

"From Architecture to Algorithm, Explain the Internal Mechanism of Meituan Takeaway Order Distribution in Detail", Web page<https://unordered.org/content/58b0b875e7000000>, Oct. 26, 2017.

* cited by examiner

SYSTEMS AND METHODS FOR ALLOCATING A SERVICE REQUEST

CROSS-REFERENCE TO RELATED APPLICATIONS

This application is a continuation of International Application No. PCT/CN2018/114376, filed on Nov. 7, 2018, which claims priority of Chinese Patent Application No. 201811312638.3 filed on Nov. 6, 2018, the entire contents of each of which are hereby incorporated by reference.

TECHNICAL FIELD

The present disclosure generally relates to an online to offline service, and more particularly, relates to systems and methods for allocating a service request.

BACKGROUND

Online to offline services (e.g., car-hailing services) have become more and more popular. Through an online service platform, a user can request an online to offline service by an application installed in his/her mobile device (e.g., a smart phone). Taking the car-hailing service as an example, the online service platform may schedule a service vehicle or a service provider after receiving service request including a pick-up location and a drop-off location. In some occasions, due to positioning errors of a positioning device (e.g., GPS positioning drift), the positioning device may send an incorrect location of the service provider to the online service platform. If the online service platform utilizes the incorrect location to determine a service provider for the service request, which may lead to a wrong order allocation. For example, the online service platform wrongly allocates the service request to the service provider far away from a service requester. Therefore, it is desirable to develop new systems and methods for allocating a service request so as to improve accuracy of current order allocation systems and methods, thereby enhancing the utility of service vehicles and improving user experience.

SUMMARY

According to an aspect of the present disclosure, a system for allocating a service request for an online to offline service is provided. The system may include at least one storage device including one or more sets of instructions, and at least one processor in communication with the at least one storage device. When executing the one or more sets of instructions, the at least one processor may receive a service request from a terminal of a service requester, the service request being for a transport service and including a pick-up location and a drop-off location. In response to the received service request, the at least one processor may determine a first service provider to provide the transport service, the first service provider having a first location at a first moment within a first threshold distance from the pick-up location. The at least one processor may generate a first service order allocating the service request to the first service provider. The at least one processor may receive, from a terminal of the first service provider, a request for navigation associated with the first service order at a second moment. In response to the request for the navigation, the at least one processor may generate route information based on a second location of the first service provider at the second moment and the pick-up location. The at least one processor may determine whether to reallocate the service request to a second service provider based on the route information. In response to the determination of reallocating the service request to the second service provider, the at least one processor may generate a second service order reallocating the service request to the second service provider, and transmit signals to a terminal of the second service provider, the signals prompting the terminal to display information associated with the second service order.

In some embodiments, in response to the determination of reallocating the service request to the second service provider, the at least one processor may transmit signals to the terminal of the service requester prompting the terminal to display information indicating reallocation of the first service order.

In some embodiments, in response to the determination of reallocating the service request to the second service provider, the at least one processor may transmit signals to the terminal of the first service provider prompting the terminal to display information indicating reallocation of the first service order.

In some embodiments, the at least one processor may determine a first distance between the second location of the first service provider at the second moment and the pick-up location based on the route information, and compare the first distance with a second threshold distance, the second threshold distance being no less than the first threshold distance.

In some embodiments, the at least one processor may determine to reallocate the service request to the second service provider if the first distance is greater than the second threshold distance. The at least one processor may not determine to reallocate the service request to the second service provider if the first distance is equal to or less than the second threshold distance.

In some embodiments, the at least one processor may determine a second distance that the first service provider moves from the first moment to the second moment. The at least one processor may determine a ratio of the second distance to a distance between a third location of the first service provider being at the first moment and the pick-up location. The at least one processor may determine to reallocate the service request to the second service provider if the determined ratio is equal to or less than a threshold value. The at least one processor may not determine to reallocate the service request to the second service provider if the determined ratio is greater than the threshold value.

In some embodiments, the at least one processor may determine the third location of the first service provider being at the first moment based on the second location of the first service provider at the second moment and the second distance.

In some embodiments, the at least one processor may search one or more candidate service providers within the first threshold distance from the pick-up location. The at least one processor may determine a route from a location of each of the one or more candidate service providers to the pick-up location. The at least one processor may select the first service provider who has the route which is the shortest. The at least one processor may allocate the service request to the first service provider.

In some embodiments, the at least one processor may search one or more candidate service providers within the second threshold distance from the pick-up location of the service requester. The at least one processor may determine a route from a location of each of the one or more candidate service providers to the pick-up location. The at least one processor may select the second service provider who has the route that is the shortest. The at least one processor may reallocate the service request to the second service provider.

According to another aspect of the present disclosure, a method is provided. The method may include one or more of the following operations. At least one processor may receive a service request from a terminal of a service requester, the service request being for a transport service and including a pick-up location and a drop-off location. In response to the received service request, the at least one processor may determine a first service provider to provide the transport service, the first service provider having a first location at a first moment within a first threshold distance from the pick-up location. The at least one processor may generate a first service order allocating the service request to the first service provider. The at least one processor may receive, from a terminal of the first service provider, a request for navigation associated with the first service order at a second moment. In response to the request for the navigation, the at least one processor may generate route information based on a second location of the first service provider at the second moment and the pick-up location. The at least one processor may determine whether to reallocate the service request to a second service provider based on the route information. In response to the determination of reallocating the service request to the second service provider, the at least one processor may generate a second service order reallocating the service request to the second service provider, and transmit signals to a terminal of the second service provider, the signals prompting the terminal to display information associated with the second service order.

According to another aspect of the present disclosure, a non-transitory computer readable medium is provided. The non-transitory computer readable medium may comprise executable instructions that cause at least one processor to effectuate a method. The method may include one or more of the following operations. The at least one processor may receive a service request from a terminal of a service requester, the service request being for a transport service and including a pick-up location and a drop-off location. In response to the received service request, the at least one processor may determine a first service provider to provide the transport service, the first service provider having a first location at a first moment within a first threshold distance from the pick-up location. The at least one processor may generate a first service order allocating the service request to the first service provider. The at least one processor may receive, from a terminal of the first service provider, a request for navigation associated with the first service order at a second moment. In response to the request for the navigation, the at least one processor may generate route information based on a second location of the first service provider at the second moment and the pick-up location. The at least one processor may determine whether to reallocate the service request to a second service provider based on the route information. In response to the determination of reallocating the service request to the second service provider, the at least one processor may generate a second service order reallocating the service request to the second service provider, and transmit signals to a terminal of the second service provider, the signals prompting the terminal to display information associated with the second service order.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
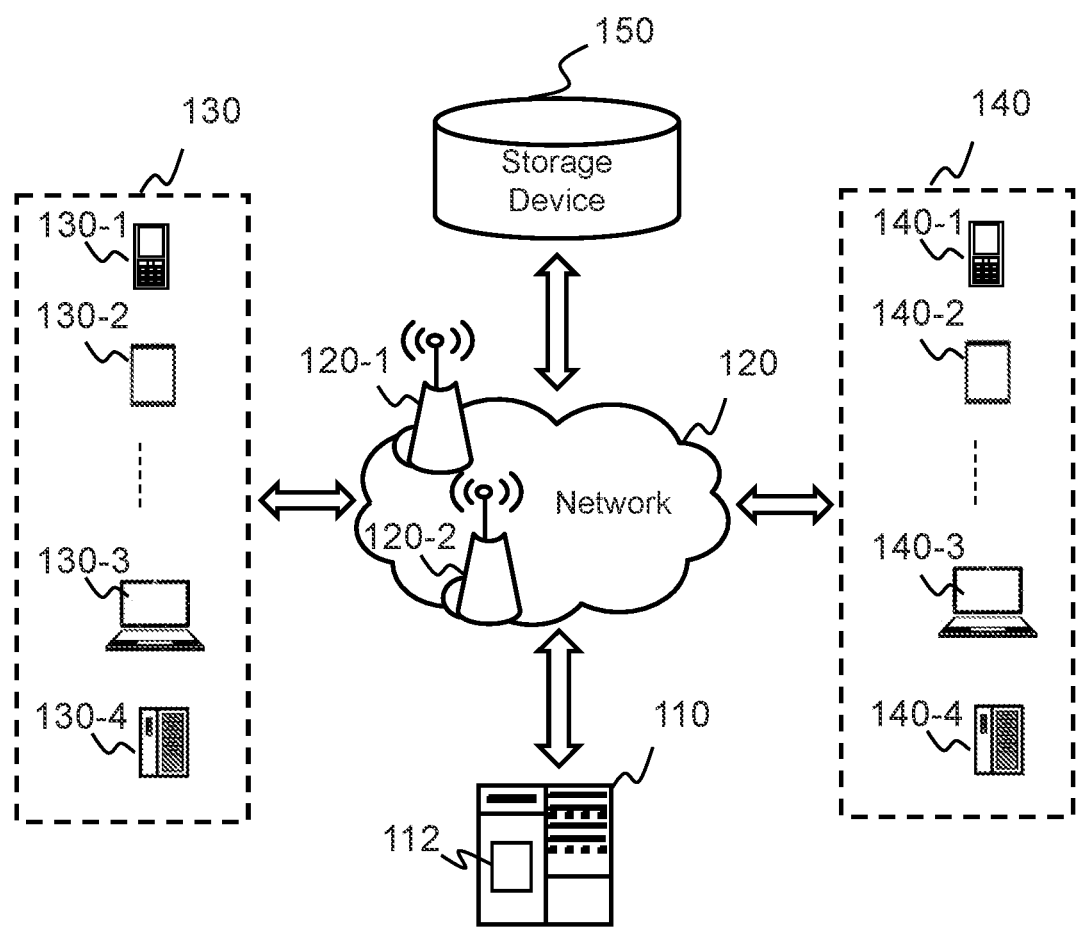
FIG. 1 is a schematic diagram illustrating an exemplary online to offline (O2O) service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while systems and methods in the present disclosure is described primarily in regard to distributing a request for a transport service, it should also be understood that the present disclosure is not intended to be limiting. The system or method of the present disclosure may be applied to any other kind of online to offline (O2O) service. For example, the systems or methods of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for transmitting and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requester, a customer, a driver, a provider, a service provider, or the like, or any combination thereof. The service request may be accepted by any one of a passenger, a service requester, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requester terminal" and "passenger terminal" in the present disclosure are used interchangeably to refer to a mobile terminal that is used by a service requester to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

In an aspect, the present disclosure is directed to systems and methods for allocating a service request. For example, upon the receipt of a request for transport service including a pick-up location and a drop-off location, the system may determine a first service provider (e.g., a driver) within a first threshold distance from the pick-up location at a first moment by using a first location of the first service provider being at the first moment. The system may allocate the service request to the first service provider. A positioning device of the system may obtain and send the first location of the first service provider for the system to determine the first service providers. However, due to positioning errors of the positioning device (e.g., GPS positioning drift), the first service provider's the first location may be incorrect. If the system determines the first service provider utilizing an incorrect first location, it may lead to a wrong order allocation, thereby resulting in compromised utility of service vehicles. To solve this issue, the system may assess whether the first order allocation is correct, and determine whether to reallocate the service request to a second service provider. For example, the system may obtain a second location of the first service provider at a second moment (e.g., a navigation request time), and determine a route from the second location to the pick-up location. The system may further determine whether to reallocate the service request to the second service provider based on the route from the second location to the pick-up location. For example, if a first distance of the route from the second location to the pick-up location is greater than a second threshold distance, the system may reallocate the service request to the second service provider replacing the first service provider. The reallocation mechanism of the system may reduce error rate of order allocation caused by the positioning errors, and improve accuracy of an order allocation system.

FIG. 1 is a schematic diagram illustrating an exemplary online to offline (O2O) service system according to some embodiments of the present disclosure. For example, the O2O service system 100 may be an online service platform for processing a service request from a user. In some embodiments, the service may be a transport service, such as a taxi hailing service, a chauffeur service, a delivery vehicle service, a carpool service, a bus service, a driver hiring service and a shuttle service. In some embodiment, the service may be any online service, such as booking a meal, shopping, or the like, or any combination thereof. The O2O service system 100 may be an online platform including a server 110, a network 120, a requester terminal 130, a provider terminal 140, and a storage device 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage device 150 via the network 120. As another example, the server 110 may be directly connected to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing device 112. The processing device 112 may process information and/or data relating to a service request to perform one or more functions described in the present disclosure. For example, the processing device 112 may obtain a service request from the requester terminal 130 via an information exchange port system (not shown in figures), and allocate the service request to a service provider (e.g., a driver). The information exchange port system may be configured to communicate with the server 110, the requester terminal 130 the provider terminal 140, and/or the storage device 150 via the network 120. In some embodiments, the processing device 112 may include one or more processors (e.g., single-core processor(s) or multi-core processor(s)). Merely by way of example, the processing device 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the O2O service system 100 (e.g., the server 110, the requester terminal 130, the provider terminal 140, and/or the storage device 150) may send information and/or data to other component(s) in the O2O service system 100 via the network 120. For example, the server 110 may obtain/acquire service request from the requester terminal 130 via the network 120. The service request may include a transport service having a pick-up location and/or a drop-off location. In some embodiments, the network 120 may be any type of wired or wireless network, or any combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or Internet exchange points 120-1, 120-2, . . . , through which one or more components of the O2O service system 100 may be connected to the network 120 to exchange data and/or information.

In some embodiments, a service requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a service provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requester" and "requester terminal" may be used interchangeably, "user" and "user terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (FDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be a device that is similar to, or the same as the requester terminal 130. In some embodiments, the provider terminal 140 may be a device utilizing positioning technology for locating the position of a user of the provider terminal 140 (e.g., a service provider) and/or the provider terminal 140. In some embodiments, the requester terminal 130 and/or the provider terminal 140 may communicate with one or more other positioning devices to determine the position of the requester, the requester terminal 130, the provider, and/or the provider terminal 140. In some embodiments, the requester terminal 130 and/or the provider terminal 140 may send positioning information to the server 110.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

The storage device 150 may store data and/or instructions. In some embodiments, the storage device 150 may store data obtained from the requester terminal 130 and/or the provider terminal 140. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the O2O service system 100 (e.g., the server 110, the requester terminal 130, the provider terminal 140, etc.). One or more components in the O2O service system 100 may access the data or instructions stored in the storage device 150 via the network 120. In some embodiments, the storage device 150 may be directly connected to or communicate with one or more components in the O2O service system 100 (e.g., the server 110, the requester terminal 130, the provider terminal 140, etc.). In some embodiments, the storage device 150 may be part of the server 110.

In some embodiments, one or more components in the O2O service system 100 (e.g., the server 110, the requester terminal 130, the provider terminal 140, etc.) may have permission to access the storage device 150. In some embodiments, one or more components in the O2O service system 100 may read and/or modify information relating to the requester, provider, and/or the public when one or more conditions are met. For example, the server 110 may read and/or modify one or more users' information after a service is completed. As another example, the provider terminal 140 may access information relating to the requester when receiving a service request from the requester terminal 130, but the provider terminal 140 may not modify the relevant information of the requester.

In some embodiments, information exchanging of one or more components in the O2O service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile Internet product, a commercial host product, an embedded product, or the like, or any combination thereof. The mobile Internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the O2O service system 100 performs, the element may perform through electrical signals and/or electromagnetic signals. For example, when a requester terminal 130 processes a task, such as making a determination, identifying or selecting an object, the requester terminal 130 may operate logic circuits in its processor to process such task. When the requester terminal 130 sends out a service request to the server 110, a processor of the requester terminal 130 may generate electrical signals encoding the service request. The processor of the requester terminal 130 may then send the electrical signals to an output port (e.g., a portion of the information exchange information port system). If the requester terminal 130 communicates with the server 110 via a wired network, the output port may be physically connected to a cable, which may further transmit the electrical signals to an input port of the server 110. If the requester terminal 130 communicates with the server 110 via a wireless network, the output port of the requester terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requester terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage device 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
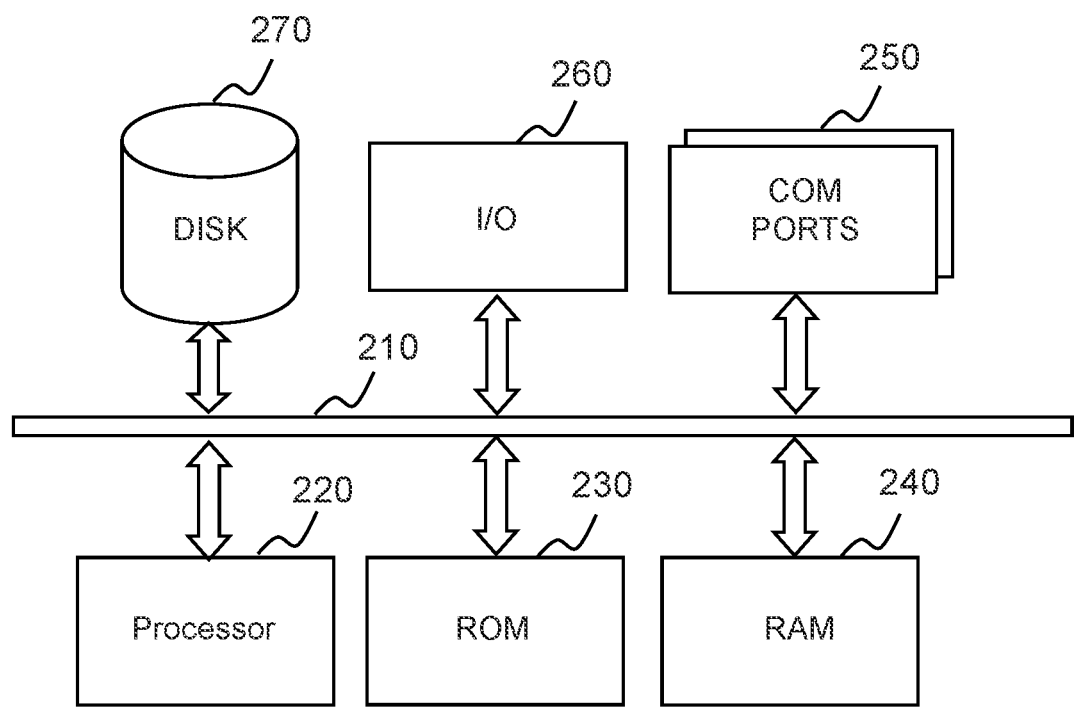
FIG. 2 is a schematic diagram illustrating exemplary components of a computing device according to some embodiments of the present disclosure.

FIG. 2 is a schematic diagram illustrating exemplary components of a computing device according to some embodiments of the present disclosure. The server 110, the requester terminal 130, the provider terminal 140, and/or the storage device 150 may be implemented on the computing device 200 according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the O2O service system 100 as described herein. In FIGS. 1 and 2, only one such computer device is shown purely for convenience purposes. One of ordinary skill in the art would understand at the time of filing of this application that the computer functions relating to the service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
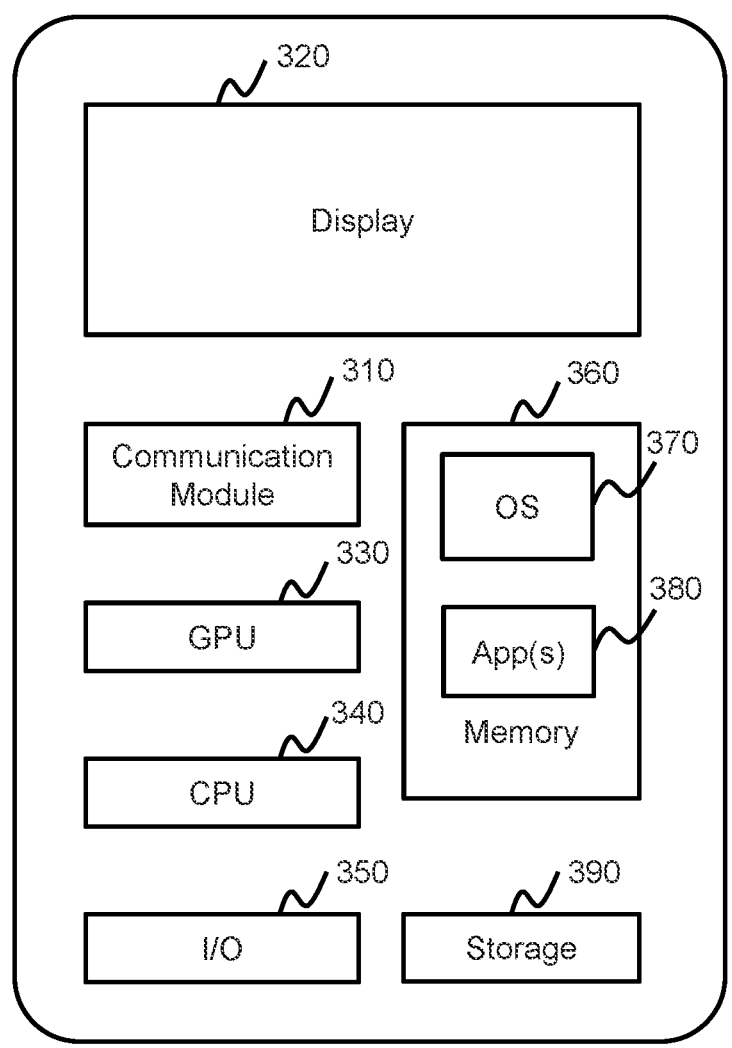
FIG. 3 is a schematic diagram illustrating hardware and/or software components of an exemplary mobile terminal according to some embodiments of the present disclosure.

FIG. 3 is a block diagram illustrating exemplary hardware and/or software components of an exemplary mobile device according to some embodiments of the present disclosure. The requester terminal 130 may be implemented on the mobile device 300 according to some embodiments of the present disclosure. As illustrated in FIG. 3, the mobile device 300 may include a communication module 310, a display 320, a graphics processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™ Windows Phone™) and one or more applications 380 may be loaded into the memory 360 from the storage 390 in order to be executed by the CPU 340. The applications 380 may include a browser or any other suitable mobile apps for transmitting track data to the server 110. User interaction with the information stream may be achieved via the I/O devices 350 and provided to the processing device 112 and/or other components of the system 100 via the network 120.

In order to implement various modules, units and their functions described above, a computer hardware platform may be used as hardware platforms of one or more elements (e.g., a component of the server 110 described in FIG. 1). Since these hardware elements, operating systems; and program languages are common, it may be assumed that persons skilled in the art may be familiar with these techniques and they may be able to provide information required in service request allocation according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
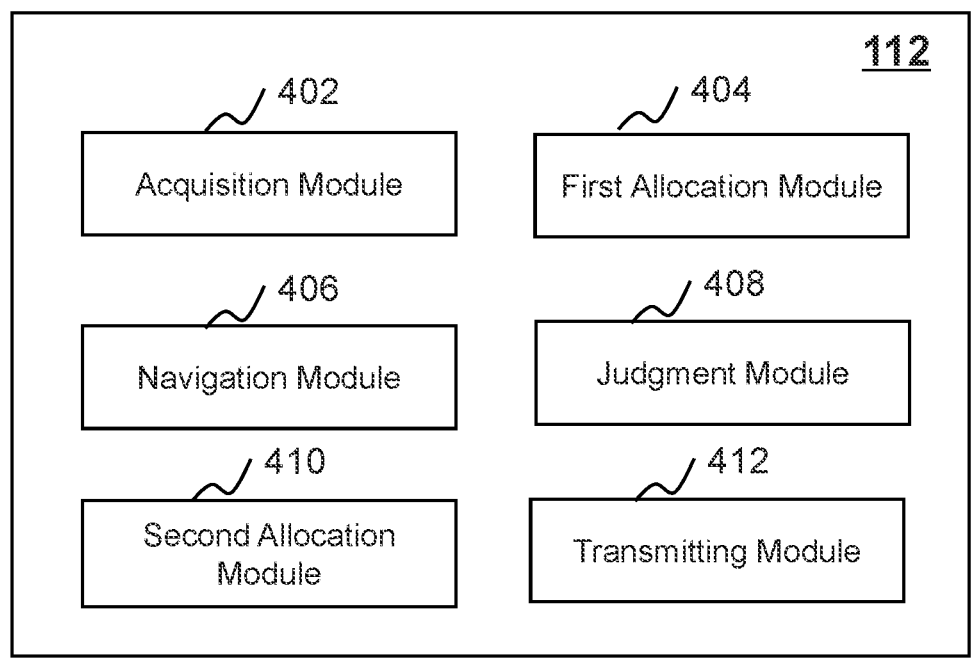
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include an acquisition module 402, a first allocation module 404, a navigation module 406, a judgment module 408, a second allocation module 410, and a transmitting module 412.

The acquisition module 402 may receive a service request from a terminal of a service requester (e.g., the requester terminal 130). The service request may be a request for an O2O service (e.g., a transport service). In some embodiments, the acquisition module 402 may obtain information relating to the service request (e.g., a pick-up location, a drop-off location, or a pick-up time, etc.) from an application installed in the requester terminal 130 (e.g., a car-hailing application) via the network 120.

The first allocation module 404 may determine a first service provider to provide the transport service, the first service provider having a first location at a first moment within a first threshold distance from the pick-up location. In some embodiments, the first allocation module 404 may search one or more candidate service providers within the first threshold distance (e.g., 2.5 km, 3 km, 3.5 km, 4 km, 5 km, etc.) from the pick-up location at the first moment. The one or more candidate service providers may be available to provide the transport service. In some embodiments, the first allocation module 404 may obtain availability status of each of one or more service providers within the first threshold distance from the pick-up location, and determine the one or more candidate service providers based on the availability status of each service provider. The availability status may indicate whether a vehicle 150 associated with the service provider is available to carry a passenger to her/his drop-off location. In some embodiments, the first allocation module 404 may determine a route from a location of each of the one or more candidate service providers to the pick-up location. For the determined one or more routes corresponding to the one or more candidate providers, the first allocation module 404 may further select a service provider that has the shortest route as the first service provider. The first allocation module 404 may generate a first service order allocating the service request to the first service provider.

The navigation module 406 may receive a request for navigation associated with the first service order at a second moment. The navigation module 406 may generate route information based on a second location of the first service provider at the second moment and the pick-up location. For example, the navigation module 406 may generate a route from the second location to the pick-up location in response to the request for navigation. In some embodiments, the generated route may be the shortest route from the second location to the pick-up location.

The judgment module 408 may determine whether to reallocate the service request to a second service provider based on the route information. In some embodiments, the judgment module 408 may determine a first distance from the second location of the first service provider at the second moment (e.g., the navigation request time) to the pick-up location. The judgment module 408 may further compare the first distance with a second threshold distance, and determine whether to reallocate the service request to the second service provider based on a comparison result. For example, if the first distance is greater than the second threshold distance, the judgment module 408 may determine to reallocate the service request to the second service provider. Otherwise, the judgment module 408 may not determine to reallocate the service request to the second service provider. In some embodiments, the second threshold distance may be no less than the first threshold distance. Note that the second threshold distance may be adjusted according to different scenarios. For example, the judgment module 408 may adjust that the second threshold distance is less than the first threshold distance in a region having high population density (e.g., in downtown of a city).

In some embodiments, if the first distance is greater than the second threshold distance, the judgment module 408 may further determine a second distance that the first service provider moves from the first moment to the second moment. The judgment module 408 may determine a ratio of the second distance to a distance between a third location of the first service provider being at the first moment and the pick-up location. The third location may indicate a relatively real/correct location where the first service provider at the first moment (e.g., Location C shown in FIG. 8). If the determined ratio is equal to or less than a threshold value (e.g., 0.1, 0.2, 0.3, 0.4, 0.5, etc.), the processor may determine to reallocate the service request to the second service provider. Otherwise, the processor may not determine to reallocate the service request to the second service provider.

The second allocation module 410 may generate a second service order reallocating the service request to the second service provider in response to the determination of reallocating the service request to the second service provider. For example, the second allocation module 410 may search one or more candidate service providers within the second threshold distance from the pick-up location at a third moment. The second allocation module 410 may determine a route from a location of each of the one or more candidate service providers to the pick-up location. The location of each of the one or more candidate service providers may be a location of the each of the one or more candidate service providers at the third moment. For the determined one or more routes corresponding to the one or more candidate providers, the second allocation module 410 may further select a service provider that has the shortest route as the second service provider. The second allocation module 410 may reallocate the service request to the second service provider for providing the service.

The transmitting module 412 may transmit signals to a terminal of the second service provider (e.g., the provider terminal 140) via the network 120 (or through an information exchange port system via the network 120). The signals may prompt the terminal of the second service provider to display information associated with the second service order. In some embodiments, the transmitting module 412 may transmit signals to the terminal of the service requester (e.g., the requester terminal 130) via the network 120 (or through the information exchange port system via the network 120). The signals may prompt the terminal of the service requester to display information indicating reallocation of the first service order. In some embodiments, the transmitting module 412 may transmit signals to the terminal of the first service provider via the network 120 (or through the information exchange port system via the network 120). The signals may prompt the terminal to display information indicating reallocation of the first service order.

It should be noted that the above description of the processing device 112 is merely provided for the purposes of illustration, and not intended to limit the scope of the present disclosure. For persons having ordinary skills in the art, multiple variations and modifications may be made under the teachings of the present disclosure. For example, the processing device 112 may further include a storage module to facilitate data storage. As another example, the first allocation module 404 and the second allocation module 410 may be integrated into a single module. However, those variations and modifications do not depart from the scope of the present disclosure.

Figure 5:
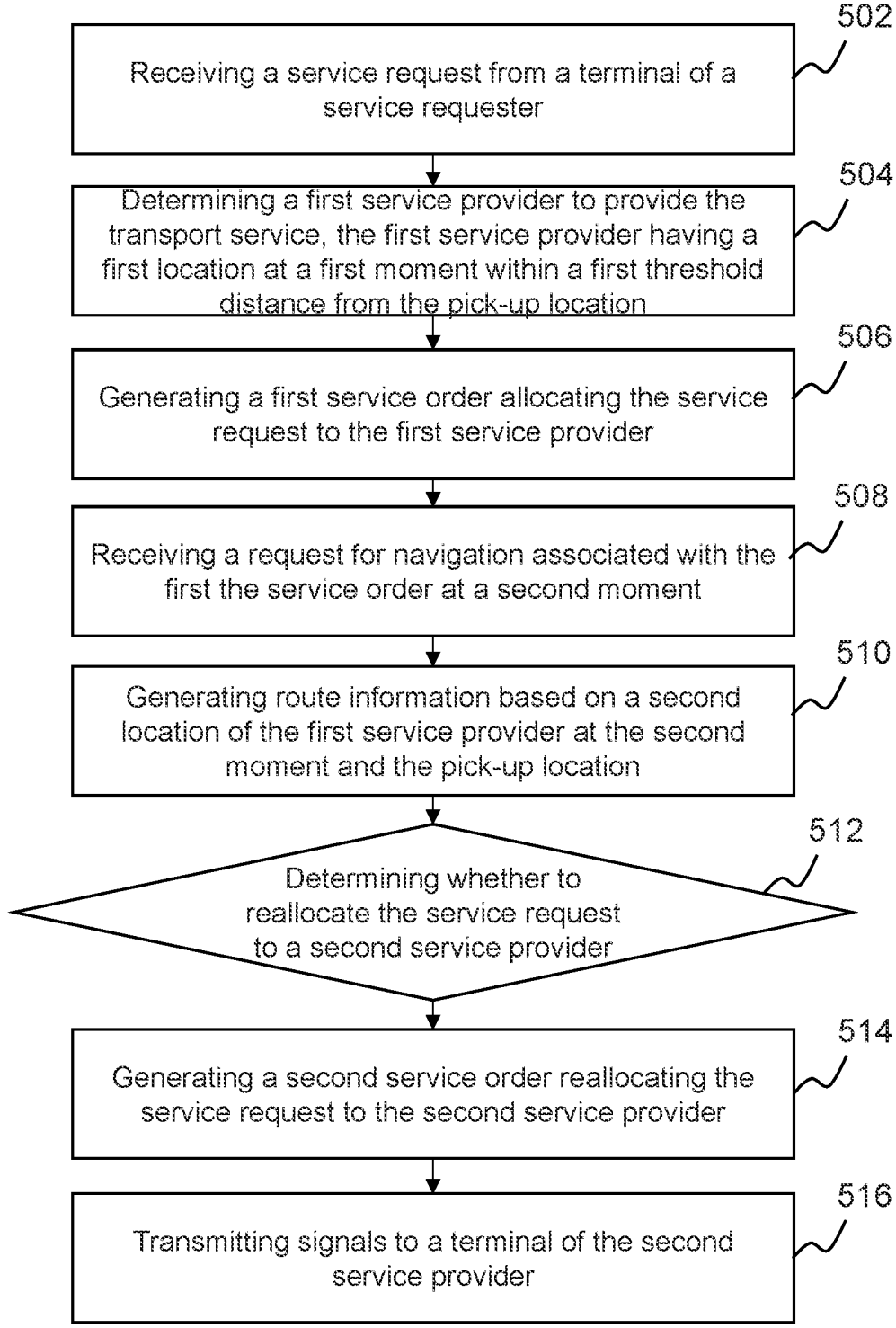
FIG. 5 is a flowchart illustrating an exemplary process for allocating a service request according to some embodiments of the present disclosure.

FIG. 5 is a flowchart illustrating an exemplary process for allocating a service request according to some embodiments of the present disclosure. In some embodiments, process 500 may be executed by the O2O service system 100. For example, the process 500 may be stored in the storage device 150 and/or the storage (e.g., the ROM 230, the RAM 240, etc.) in a form of instructions, and invoked and/or executed by the server 110 (e.g., the processing device 112 in the server 110, or the processor 220 of the processing device 112 in the server 110). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the processor (e.g., the acquisition module 402 of the processing device 112) may receive a service request from a terminal of a service requester (e.g., the requester terminal 130). The service request may be a request for an O2O service (e.g., a transport service). In some embodiments, the service requester may sent out the service request (e.g., the transport service) by an application (e.g., a car-hailing application) installed in the requester terminal 130. The service request may include a pick-up location and/or a drop-off location of the service requester. The acquisition module 402 may receive information relating to the service request (e.g., a pick-up location, a drop-off location, or a pick-up time, etc.) from the application via the network 120.

In some embodiments, the service request may be a real-time request or an appointment request. For example, the real-time request may be a request that requires a service provider to carry out the service immediately or at a defined time period reasonably close to the request time (e.g., 1 minute, 2 minutes, 3 minutes, etc.). The appointment request may be a request that requires the service provider to carry out the service in an appointed time point (e.g., a certain moment in one hour later).

In some embodiments, the service request may refer to a request for transport service with a pick-up location and/or a drop-off location but has not been formally made (or sent) by a service requester. For example, the service request may be a yet-to-be sent request. In certain embodiments, the yet-to-be sent request may be in the form of a partially-entered request that is not sent or a complete-entered request that is not sent. For example, the partially-entered request may be a request that includes one of a pick-up location and a drop-off location, or a part of the one of a pick-up location and a drop-off location. The complete-entered request may be a request includes both the pick-up location and the drop-off location. In certain embodiments, the application installed in the requester terminal 130 may be configured to detect user input (e.g., the service request). Such yet-to-be sent requests may also trigger the process as shown in the present disclosure (e.g., the process 500 shown in FIG. 5).

Figure 8:
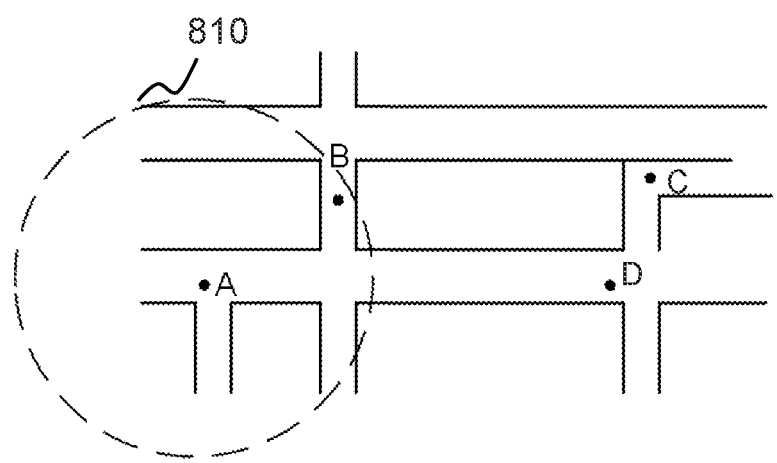
FIG. 8 is a schematic diagram illustrating an exemplary situation of an order reallocation according to some embodiments of the present disclosure.

In 504, the processor (e.g., the first allocation module 404 of the processing device 112) may determine a first service provider to provide the transport service, the first service provider having a first location at a first moment within a first threshold distance from the pick-up location. In some embodiments, the processor may search one or more candidate service providers within the first threshold distance from the pick-up location at the first moment. In some embodiments, because both a first moment when the processor searches the first service provider and a moment when the processor allocate the service order to the first service provider may be almost simultaneous, the first moment may be designated as "a first order allocation time". The one or more candidate service providers may be available to provide the transport service. In some embodiments, the processor may obtain availability status of each of one or more service providers within the first threshold distance from the pick-up location, and determine the one or more candidate service providers based on the availability status of each service provider. The availability status may indicate whether a vehicle 150 associated with the service provider is available to carry a passenger to her/his drop-off location. The provider terminal 140 of each service provider may periodically or real-time transmit its availability status and/or current location to the server 110. The processor may determine the one or more candidate providers that are available to provide the transport service based on the availability status. In some embodiments, the processor may determine a route from a location of each of the one or more candidate service providers to the pick-up location. The location of each of the one or more candidate service providers may be a location of the each of the one or more candidate service providers at the first moment. The processor may obtain the location of the each of the one or more candidate service providers through a positioning device of the O2O service system 100 (e.g., a GPS system). The obtained location may be a correct location or an incorrect location. If there are positioning errors (e.g., positioning drift or caused by degraded GPS signals) when the positioning device detects the location, the obtained location may be the incorrect location. For example, as shown in FIG. 8, Location B is the first location of the first service provider at the first moment by the positioning device, while in reality the first service provider may be at Location C at the first moment. The obtained first location (i.e., Location B) obtained by the positioning device may be the incorrect location. In some embodiments, the processor may obtain the route from the location of each candidate service provider to the pick-up location based on a third-party database providing map service or navigation service (e.g., a commercial map server). For the determined one or more routes corresponding to the one or more candidate providers, the processor may further select a service provider that has a shortest route as the first service provider. The processor may allocate the service request to the first service provider for providing the service.

In some embodiments, the first threshold distance may be preset by the O2O service system 100. The first threshold distance may be any preset numerical value, such as 2.5 km, 3 km, 3.5 km, 4 km, 5 km, and so on. The first threshold distance may be adjusted according to different scenarios and different goals. For example, if the request time of the service request is in rush hours (e.g., 7:00 a.m.-9:30 a.m. or 5:00 p.m. to 7:30 p.m.), the first threshold distance may be adjusted to be lower. As another example, the pick-up location of the service request is a suburb, the first threshold distance may be adjusted to be higher. For those skilled in the art, the preset first threshold distance may be various, and such variations may be within the protect scope of the present disclosure.

In 506, the processor (e.g., the first allocation module 404 of the processing device 112) may generate a first service order allocating the service request to the first service provider. The first service order may include but not limited to a pick-up location, a drop-off location, route information, passenger information (e.g., the number of passengers, gender, age, etc.), and so on. The processor (e.g., the transmitting module 412 of the processing device 112) may transmit the first service order to a terminal of the first service provider (e.g., the provider terminal 140).

After receiving the first service order, the first service provider may be ready for providing the service based on information related to the first service order. For example, the first service provider may request for navigation associated with the first service order at a second moment (e.g., request for a route from a current location of the first service provider being at the second moment to the pick-up location). The second moment is later than the first moment. In some embodiments, the second moment may refer to a time for requesting navigation (also be called "navigation request time"). In some occasions, due to movement of vehicle 150 associated with the first service provider at a certain speed, a location of the vehicle 150 (i.e., the location of the first service provider) may move from a location of the first service provider at the first moment to a second location of the first service provider at the second moment. For example, as shown in FIG. 8, assuming that the obtained first location of the first service provider (i.e., Location B) is an incorrect location, the correct location of the first service provider at the first moment is Location C, the second location of the first service provider at the second moment is Location D, the first service provider may move from Location C to Location D.

In 508, the processor (e.g., the navigation module 406 of the processing device 112) may receive the request for navigation associated with the first service order at the second moment. In some embodiments, the first service provider may sent out the request for navigation through the provider terminal 140 (e.g., via an application installed in the provider terminal 140) at the second moment. The request for navigation may include a location of the first service provider at the navigation request time (i.e., the second location) and the pick-up location of the service requester. The navigation module 406 may receive the request for navigation from the provider terminal 140 via the network 120 (e.g., from an application installed in the provider terminal 140).

In 510, the processor (e.g., the navigation module 406 of the processing device 112) may generate route information based on the second location of the first service provider at the second moment and the pick-up location. The navigation module 406 may generate a route from the second location to the pick-up location in response to the request for navigation. In some embodiments, the generated route may be the shortest route from the second location to the pick-up location. For example; the navigation module 406 may generate one or more routes from the second location to the pick-up location based on the third-party database (e.g., the commercial map server). The shortest route among the generated one or more routes may be designated as a target route for transmitting to the provider terminal 140 of the first service provider.

In some occasions, the processor may wrongly allocate a service request to a service requester having an incorrect location at the first moment due to positioning errors caused by the positioning device of the O2O service system 100. For example, if a service provider A is be wrongly located as "Location B" by the positioning device of the O2O service system 100, but in fact the correct location of the service provider A is "Location C", "Location B" may be far away from the correct location, "Location C". In this case, the processor wrongly selects the service provider A as a target service provider for providing service because the route from the incorrect location, "Location B", to the pick-up location is the shortest than routes of other candidate service providers within the first threshold distance. It is apparent that the service request is allocated wrongly to an improper service provider (i.e., the service provider A). To solve such issues, the processor may assess whether the order allocation is correct, and determine whether to reallocate the service request to a second service provider replacing the first service provider.

In 512, the processor (e.g., the judgment module 408 of the second processing device 112) may determine whether to reallocate the service request to a second service provider based on the route information. In some embodiments, the processor may determine a first distance from the second location of the first service provider at the second moment (e.g., the navigation request time) to the pick-up location. As used herein, a distance from location P1 to location P2 may refer to a route length from location P1 to location P2. The processor may further compare the first distance with a second threshold distance, and determine whether to reallocate the service request to the second service provider based on a comparison result. For example, if the first distance is greater than the second threshold distance, the judgment module 408 may determine to reallocate the service request to the second service provider. Otherwise, the judgment module 408 may not determine to reallocate the service request to the second service provider. In some embodiments, the second threshold distance may be no less than the first threshold distance. Note that the second threshold distance may be adjusted according to different scenarios. For example, the judgment module 408 may adjust that the second threshold distance is less than the first threshold distance in a region having high population density (e.g., in downtown of a city).

In some embodiments, if the first distance is greater than the second threshold distance, the processor may further determine a second distance that the first service provider moves from the first moment to the second moment. The processor may determine a ratio of the second distance to a distance between a third location of the first service provider being at the first moment and the pick-up location. The third location may indicate a relatively real/correct location where the first service provider at the first moment (e.g., Location C shown in FIG. 8). If the determined ratio is equal to or less than a threshold value (e.g., 0.1, 0.2, 0.3, 0.4, 0.5, etc.), the processor may determine to reallocate the service request to the second service provider. Otherwise, the processor may not determine to reallocate the service request to the second service provider. More descriptions about determination of reallocating the service request to a second service provider may be found elsewhere in the present disclosure (e.g., FIGS. 6-8, and the descriptions thereof).

In 514, in response to the determination of reallocating the service request to the second service provider, the processor (e.g., the second allocation module 410 of the processing device 112) may generate a second service order reallocating the service request to the second service provider. The operation of generating the second service order may be similar to the operation of generating the first service order in operations 504 and 506. For example, the second allocation module 410 may search one or more candidate service providers within the second threshold distance from the pick-up location at a third moment. In some embodiments, the second threshold distance may be no less than the first threshold distance. While the second threshold distance may be adjusted to lower than the first threshold distance in a specific scenario, for example, the processor may adjust that the second threshold distance is less than the first threshold distance in a region having high population density (e.g., in downtown of a city). The one or more candidate service providers may be available to provide the transport service. The second allocation module 410 may determine a route from a location of each of the one or more candidate service providers to the pick-up location. The location of each of the one or more candidate service providers may be a location of the each of the one or more candidate service providers at the third moment. The second allocation module 410 may obtain the location of the each of the one or more candidate service providers through a positioning device of the O2O service system 100 (e.g., a GPS system). In some embodiments, the second allocation module 410 may obtain the route from the location of each candidate service provider to the pick-up location based on the third-party database providing map service or navigation service (e.g., a commercial map server). For the determined one or more routes corresponding to the one or more candidate providers, the second allocation module 410 may further select a service provider that has a shortest route as the second service provider. The second allocation module 410 may reallocate the service request to the second service provider for providing the service.

In 516, in response to the determination of reallocating the service request to the second service provider, the processor (e.g., the transmitting module 412 of the processing device 112) may transmit signals to a terminal of the second service provider (e.g., the provider terminal 140) via the network 120 (or through an information exchange port system via the network 120). The signals may prompt the terminal of the second service provider to display information associated with the second service order. The information associated with the second service order may include but not limited to a pick-up location, a drop-off location, route information (e.g., a first route from the second location to the pick-up location, and/or a second route from the pick-up location to the drop-off location, etc.), passenger information (e.g., the number of passengers, gender, age, etc.), and so on. In some embodiments, the information associated with the second service order may be displayed in various forms, for example, a message, an audio, a video, an image, etc.

Figure 9:
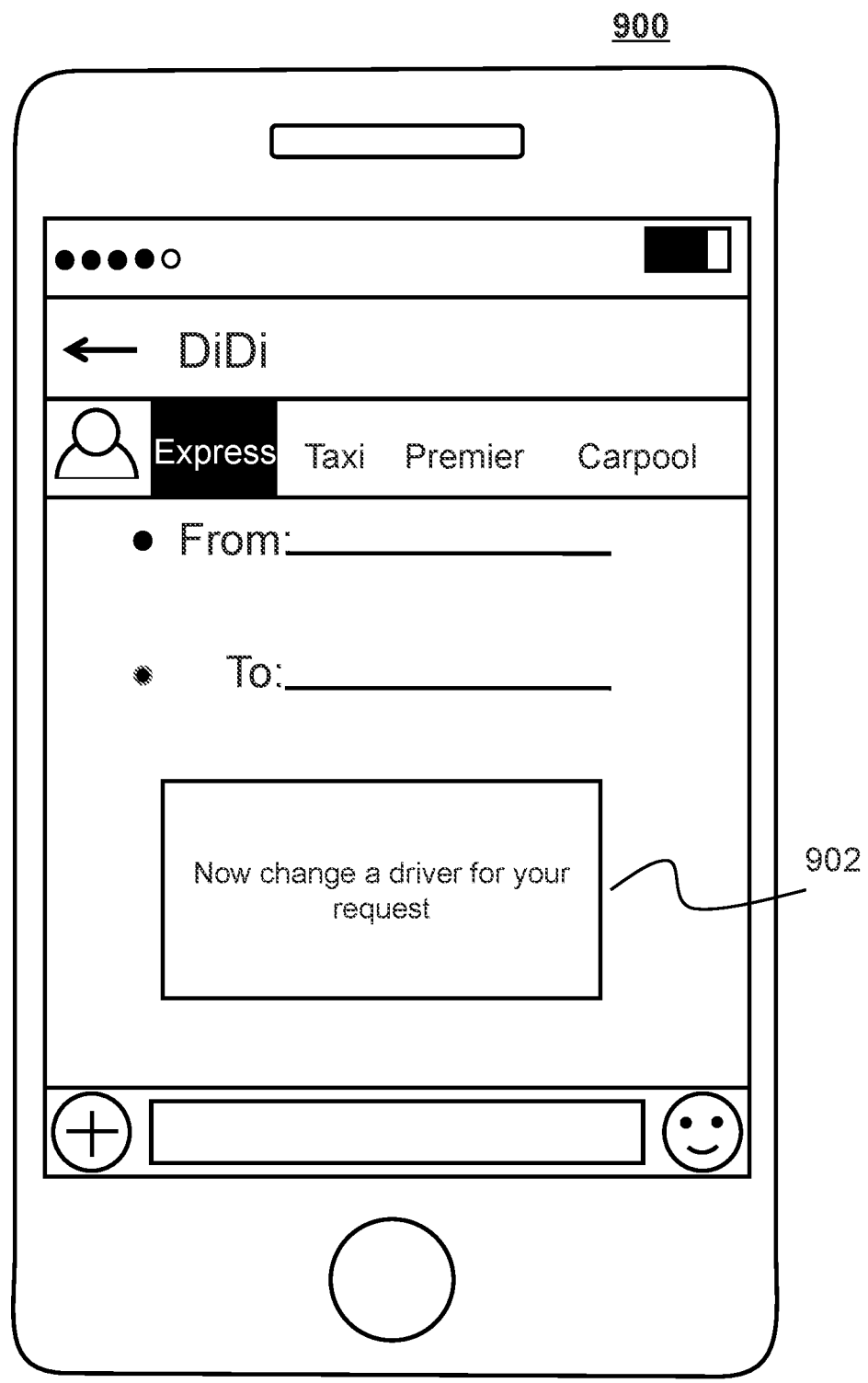
FIG. 9 is a schematic diagram illustrating an exemplary user interface presenting information indicating reallocation of a service order according to some embodiments of the present disclosure.

In some embodiments, in response to the determination of reallocating the service request to the second service provider, the processor may transmit signals to the terminal of the service requester (e.g., the requester terminal 130) via the network 120 (or through the information exchange port system via the network 120). The signals may prompt the terminal of the service requester to display information indicating reallocation of the first service order. For example, as shown in FIG. 9, the signals may direct the terminal to display information indicating reallocation of the first service order on a user interface of an application 900 installed in the requester terminal 130 (e.g., a car-hailing application). Merely for illustration, as shown in a pop-up box 902 on the user interface, the displayed information is "Now change a driver for your request", indicating the reallocation of the first service order. In some embodiments, the information indicating reallocation of the first service order may be displayed in various forms on the terminal of the first service provider, for example, a message, an audio, a video, an image, etc.

In some embodiments, in response to the determination of reallocating the service request to the second service provider, the processor may transmit signals to the terminal of the first service provider via the network 120 (or through the information exchange port system via the network 120). The signals may prompt the terminal to display information indicating reallocation of the first service order. For example, similar to the information displayed in the pop-up box 902, the displayed information, on a user interface of an application installed in the terminal of the first service provider, may be "Sorry, now change a new order for you". In some embodiments, the information indicating reallocation of the first service order may be displayed in various forms on the terminal of the first service provider, for example, a message, an audio, a video, an image, etc.

In some embodiments, after receiving such information above, the service requester and/or the service provider (e.g., the first service provider or the second service provider) may also send a response information to the O2O service system 100. For example, the service requester may send the response information receiving/rejecting the reallocation of the service order. As another example, the first service provider may send the response information confirming the reallocation of the service order. As a further example, the second service provider may send the response information receiving/rejecting the reallocation of the service order. The service requester and/or the service provider may send the response information via various forms, for example, a phone call, a message, or a dialog box in an application of the car-hailing service.

It should be noted that the above description of the process 500 is merely provided for the purposes of illustration, and not intended to limit the scope of the present disclosure. For persons having ordinary skills in the art, multiple variations and modifications may be made under the teachings of the present disclosure. For example, if the second service provider is also a wrong provider as well as the first service provider, the processor may further determine a third service provider for providing the service. In some embodiments, the processor may perform at least one part of process 500 multiple times (e.g., operations 512 and 514) until the processor determines an optimal service provider that satisfies the service request, for example, the real route from a location of the optimal service provider to the pick-up location is shortest. However, those variations and modifications do not depart from the scope of the present disclosure.

Figure 6:
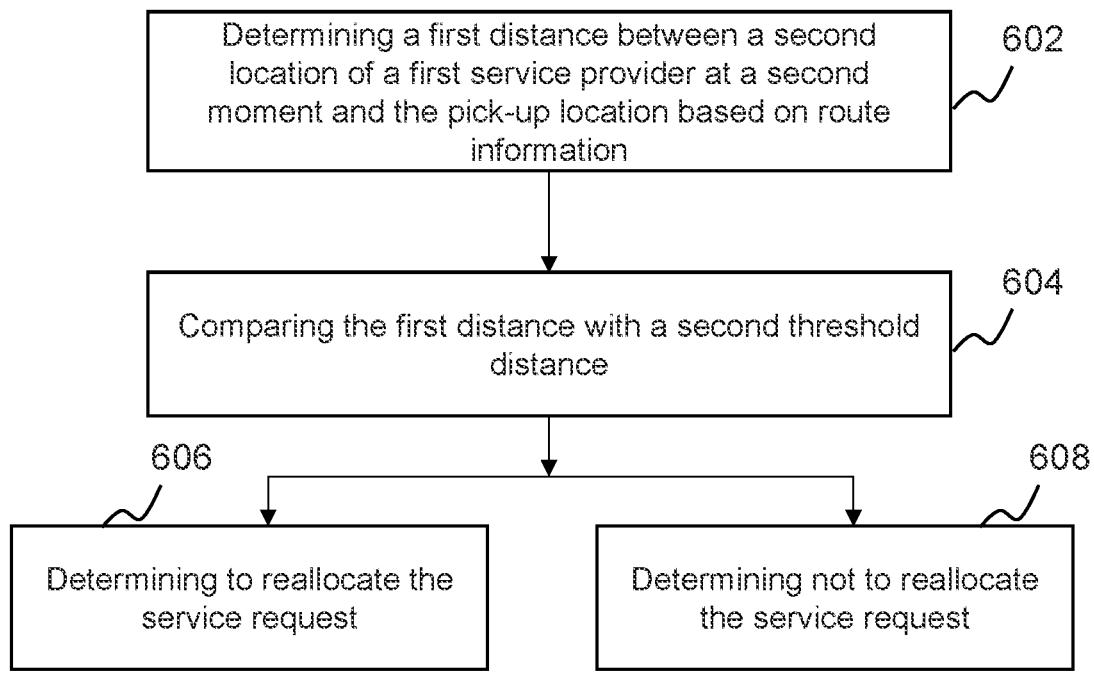
FIG. 6 is a flowchart illustrating an exemplary process for determining whether to reallocate a service request according to some embodiments of the present disclosure.

FIG. 6 is a flowchart illustrating an exemplary process for determining whether to reallocate a service request according to some embodiments of the present disclosure. In some embodiments, process 600 may be executed by the O2O service system 100. For example, the process 600 may be stored in the storage device 150 and/or the storage (e.g., the ROM 230, the RAM 240, etc.) in a form of instructions, and invoked and/or executed by the server 110 (e.g., the processing device 112 in the server 110, or the processor 220 of the processing device 112 in the server 110). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the processor (e.g., the judgment module 408 of the processing device 112) may determine a first distance between a second location of a first service provider at a second moment and the pick-up location based on route information. In some embodiments, the processor (e.g., the first allocation module 404) may determine the first service provider to provide the service (e.g., the transport service) from one or more candidate service providers within a first distance threshold (e.g., 2.5 km, 3 km, 3.5 km, 4 km, 5 km, etc.) from the pick-up location. In contrast with other candidate service provider(s), the route from a first location to the pick-up location may be shortest. The first location may refer to a location of the first service provider at a first moment (e.g., a time when the processor searches the one or more candidate service providers). In some occasions, after receiving the allocated first service order, the first service provider may request for navigation that is from his/her location to the pick-up location at the second moment. The location corresponding to the second moment (i.e., the second location) may be different from a location corresponding to the first moment. For example, the first service provider moves to the second location from the first moment to the second moment. In some embodiments, the second moment refers to the navigation request time. In some embodiments, the processor (e.g., the navigation module 406) may generate the shortest route from the second location to the pick-up location. The processor (e.g., the judgment module 408) may determine the first distance of the shortest route from the second location to the pick-up location. Note that, in some embodiments, if the service provider does not move from the first moment to the second moment, the location corresponding to the second moment may be same as a location corresponding to the first moment.

In 604, the processor (e.g., the judgment module 408 of the processing device 112) may compare the first distance with a second threshold distance (e.g., 2.5 km, 3 km, 3.5 km, 4 km, 5 km, etc). In some embodiments, the second threshold distance may be no less than the first threshold distance. Note that the second threshold distance may be adjusted according to different scenarios. For example, the processor may adjust that the second threshold distance is less than the first threshold distance in a region having high population density (e.g., in downtown of a city). The processor may determine whether to reallocate the service request to the second service provider based on a comparison result. For example, if the first distance is greater than the second threshold distance, the judgment module 408 may proceed to operation 606, determine to reallocate the service request to the second service provider. As another example, if the first distance is equal to or less than the second threshold distance, the judgment module 408 may proceed to operation 608, determine not to reallocate the service request to the second service provider. If the judgment module 408 does not determine to reallocate the service request to the second service provider, which means that the first service provider may be optimal service provider and continue executing the first service order.

In some embodiments, although the first distance is greater than the second threshold distance, the processor may not reallocate the service request to the second service provider. For example, upon the receipt of the first service order, the first service provider may take action immediately to pick up the service requester, Before the determination of the reallocating the service request to the second service provider, the first service provider has paid relatively big cost for picking up the service requester. In this case, the processor may not determine to reallocate the service request for the sake of the first service provider. In some embodiments, if the first distance is greater than the second threshold distance, the processor may further execute at least one portion of process 700 as illustrated in FIG. 7 (e.g., operations 706 and 708) to determine whether to reallocate the service request.

Figure 7:
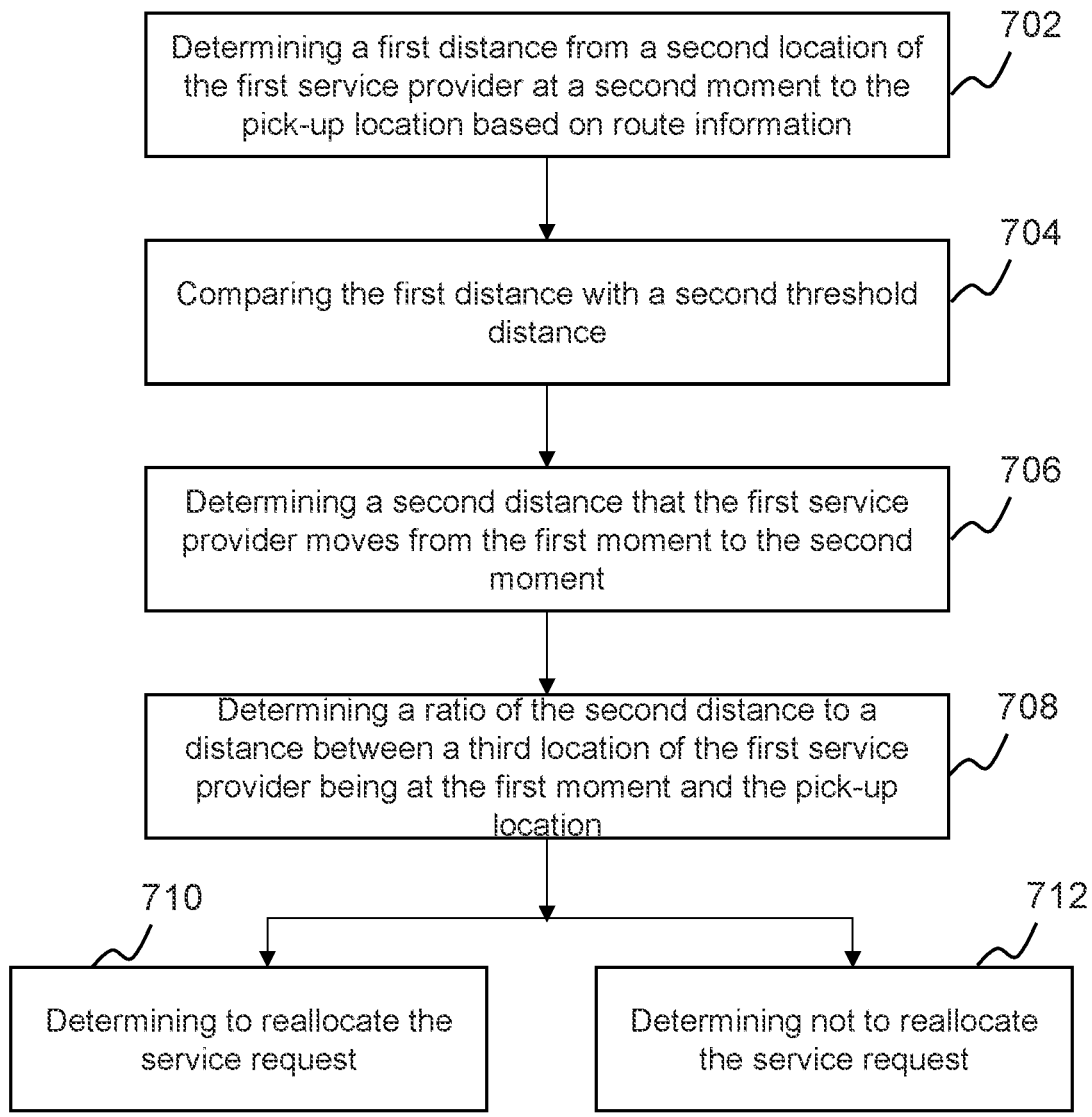
FIG. 7 is a flowchart illustrating an exemplary process for determining whether to reallocate a service request according to some embodiments of the present disclosure.

FIG. 7 is a flowchart illustrating an exemplary process for determining whether to reallocate a service request according to some embodiments of the present disclosure. In some embodiments, process 700 may be executed by the O2O service system 100. For example, the process 700 may be stored in the storage device 150 and/or the storage (e.g., the ROM 230, the RAM 240, etc.) in a form of instructions, and invoked and/or executed by the server 110 (e.g., the processing device 112 in the server 110, or the processor 220 of the processing device 112 in the server 110). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

Operations 702 and 704 may be similar to operations 602 and 604 of the process 600 described above, the detailed descriptions of which may be found in this disclosure in connection with FIG. 6.

In 706, if the first distance is greater than the second threshold distance, the processor (e.g., the judgment module 408 of the processing device 112) may determine a second distance that the first service provider moves from the first moment to the second moment. In some embodiments, the second distance may refer to a distance that a vehicle associated with the first service provider moves from the first moment to the second moment. In some embodiments, the terminal of the first service provider may transmit its track data to the O2O service system 100 in real time or near real time via the network 120. The track data may include but not limited to locations corresponding to a plurality of time points, a driving speed of the vehicle associated with the terminal, a driving direction of the vehicle associated with the terminal, and so on. The processor may determine the second distance based on the track data. For example, the processor may determine an average speed of the vehicle between the first moment, and the second moment and a time length between the first moment and the second moment. The second distance may be equal to a product of the average speed and the time length. As another example, the processor may directly obtain the second distance from an information source storing the vehicle's track data. In some embodiments, the information source may be provided by a vehicle server of a vehicle associated with a service provider.

In 708, the processor may determine a ratio of the second distance to a distance between a third location of the first service provider being at the first moment and the pick-up location. The third location may indicate a relatively real/correct location where the first service provider at the first moment. In some embodiments, if the first location is the correct location where the first service provider at the first moment, the third location may be same or close to the first location. In some embodiments, if the first location is an incorrect location caused by positioning errors of the positioning device of the O2O service system 100, The third location may be far away from the first location. For example, as shown in FIG. 8, Location C denotes the third location, Location B denotes the first location, Location C is far away from Location B. In some embodiments, the processor may determine the third location based on the second location of the first service provider at the second moment and the second distance. The third location may be a location that is the second distance (e.g., 5 km) from the second location along the driving direction. In some embodiments, the processor may determine the distance between the third location and the pick-up location. More specifically, the processor may obtain the shortest route from the third location to the pick-up location, and determine the distance of the shortest route. The processor may further determine the ratio of the second distance to the determined distance between the third location and the pick-up location.

In some embodiments, if the determined ratio is equal to or less than a threshold value (e.g., 0.1, 0.2, 0.3, 0.4, 0.5, etc.), the processor may proceed to operation 710, determine to reallocate the service request to a second service provider. If the determined ratio is greater than the threshold value, the processor may proceed to operation 712, determine not to reallocate the service request to a second service provider. Note that the threshold value may be adjusted by the O2O service system 100.

It should be noted that the above description of the process 700 for determining whether to reallocate the service request is merely provided for the purposes of illustration, and not intended to limit the scope of the present disclosure. For persons having ordinary skills in the art, multiple variations and modifications may be made under the teachings of the present disclosure. For example, operation 706 and operation 708 may be integrated into a single operation. As another example, operation 708 may be omitted. The processor may compare the second distance with a value (e.g., 500 m, 1 km, 2 km, 3 km, etc.), and determine whether to reallocate the service request based on a comparison result. If the second distance is greater than the value, the processor may reallocate the service request. Otherwise, the processor may not reallocate the service request. However, those variations and modifications do not depart from the scope of the present disclosure.

FIG. 8 is a schematic diagram illustrating an exemplary scenario of an order reallocation according to some embodiments of the present disclosure. As shown in FIG. 8, Location A denotes a pick-up location of a service requester. Upon the receipt of a service request from the service requester, the processor may search one or more candidate service providers within the first threshold distance from the pick-up location (i.e., Location A), for example, the dash circle 810 denotes a search region within the first threshold distance from Location A. The processor may determine a first service provider from the one or more candidate service providers. A route from a first location of the first service provider at the first moment to the pick-up location may be the shortest. Note that the first location may be an incorrect location caused by positioning errors of the positioning device of the O2O service system 100 (e.g., positioning drift), while in reality a correct location of the first service provider may be far away from the first location. For example, Location B denotes the first location of the first service provider detected by the positioning device at the first moment. Assuming that Location B is an incorrect location. Location C denotes a correct location of the first service provider at the first moment (also referred to herein as a third location), As seen from FIG. 8, the correct location (i.e., Location C) is far away from the incorrect location (i.e., Location B), and beyond from the search region 810. The processor receives the incorrect location from the positioning device, and uses the incorrect location to determine the first service provider. That is to say, the processor may wrongly allocate the service request to the first service provider. The processor may further determine whether to reallocate the service request to a second service provider.

In some embodiments, the first service provider may request for navigation at the second moment. Location D denotes a second location of the first service provider at the second moment. The processor may determine a first distance between the second location and the pick-up location. If the first distance between the second location and the pick-up location is greater than a second threshold distance, for example, a route distance from the second location to the pick-up location, the processor may reallocate the service request to a second service provider replacing the first service provider. Otherwise, the processor may not reallocate the service request, and the first service provider may continue executing the service.

In some embodiments, although the first distance between the second location and the pick-up location is greater than a second threshold distance, the processor may not reallocate the service request to a second service provider replacing the first service provider because the first service provider may had paid relatively a big cost for the service by the second moment. For example, before the processor determines whether to reallocate the service requester, the first service provider has driven from the third location (i.e., Location C) to the second location (i.e., Location D), the processor may determine a distance between the third location and the second location (also referred to herein as a second distance), for example, a route distance from Location C to Location D. The route distance from Location C to Location D may be determined based on track data of the first service provider (or a vehicle associated with the first service provider). The processor may determine whether to reallocate the service request based on the second distance and a distance between the third location and the pick-up location (e.g., a route distance from Location C to Location A). If a ratio of the second distance to the distance between the third location and the pick-up location is equal to or less than a threshold value, the processor may determine to reallocate the service request to the second service provider. Otherwise, the processor may not determine to reallocate the service request to the second service provider.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer-readable media having computer readable program code embodied thereon. The one or more computer-readable media may include ROM, RAM, magnetic disk, optical disk, or the like, or any combination thereof.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system for allocating a service request for an online to offline service, the system comprising:
    at least one storage device including one or more sets of instructions;
    at least one processor in communication with the at least one storage device, wherein when executing the one or more sets of instructions, the at least one processor is configured to cause the system to:
    receive a service request from a terminal of a service requester, the service request being for a transport service and including a pick-up location and a drop-off location;
    in response to the received service request:
        determine a first service provider to provide the transport service, the first service provider having a first location at a first moment within a first threshold distance from the pick-up location;
        generate a first service order allocating the service request to the first service provider;
        receive, from a terminal of the first service provider, a request for navigation associated with the first service order at a second moment;
    in response to the request for the navigation:
        generate route information based on a second location of the first service provider at the second moment and the pick-up location;
        determine whether to reallocate the service request to a second service provider based on the route information;
    in response to the determination of reallocating the service request to the second service provider:
        generate a second service order reallocating the service request to the second service provider; and
        transmit signals to a terminal of the second service provider, the signals prompting the terminal of the second service provider to display information associated with the second service order,
    wherein to determine whether to reallocate the service request to a second service provider based on the route information, the at least one processor is further configured to cause the system to:
        determine a first distance between the second location of the first service provider at the second moment and the pick-up location based on the route information; and
        compare the first distance with a second threshold distance, the second threshold distance being no less than the first threshold distance.

2. The system of claim 1, wherein the at least one processor is further configured to cause the system to:
    in response to the determination of reallocating the service request to the second service provider, transmit signals to the terminal of the service requester prompting the terminal of the service requester to display information indicating reallocation of the first service order.

3. The system of claim 1, wherein the at least one processor is further configured to cause the system to:
    in response to the determination of reallocating the service request to the second service provider, transmit signals to the terminal of the first service provider prompting the terminal of the first service provider to display information indicating reallocation of the first service order.

4. The system of claim 1, wherein
    if the first distance is greater than the second threshold distance, determine to reallocate the service request to the second service provider; and
    if the first distance is equal to or less than the second threshold distance, determine not to reallocate the service request to the second service provider.

5. The system of claim 1, wherein to determine whether to reallocate the service request to a second service provider based on the route information, the at least one processor is further configured to cause the system to:
    determine a second distance that the first service provider moves from the first moment to the second moment;
    determine a ratio of the second distance to a distance between a third location of the first service provider at the first moment and the pick-up location, the third location of the first service provider at the first moment indicating a relatively correct location where the first service provider at the first moment is;

determine to reallocate the service request to the second service provider if the determined ratio is equal to or less than a threshold value; and determine not to reallocate the service request to the second service provider if the determined ratio is greater than the threshold value.

6. The system of claim 5, wherein the third location of the first service provider at the first moment is determined based on the second location of the first service provider at the second moment and the second distance.

7. The systems of claim 1, wherein to generate the first service order, the at least one processor is further configured to cause the system to:

search one or more candidate service providers within the first threshold distance from the pick-up location;

determine a route from a location of each of the one or more candidate service providers to the pick-up location;

select the first service provider who has the route which is the shortest; and allocate the service request to the first service provider.

8. The systems of claim 1, wherein to generate the second service order, the at least one processor is further configured to cause the system to:

search one or more candidate service providers within the second threshold distance from the pick-up location of the service requester;

determine a route from a location of each of the one or more candidate service providers to the pick-up location;

select the second service provider who has the route that is the shortest; and reallocate the service request to the second service provider.

9. A method for allocating a service request for an online to offline service, the method comprising:

receiving a service request from a terminal of a service requester, the service request being for a transport service and including a pick-up location and a drop-off location;

in response to the received service request:

determining a first service provider to provide the transport service, the first service provider having a first location at a first moment within a first threshold distance from the pick-up location;

generating a first service order allocating the service request to the first service provider;

receiving, from a terminal of the first service provider, a request for navigation associated with the first service order at a second moment;

in response to the request for the navigation:

generating route information based on a second location of the first service provider at the second moment and the pick-up location;

determining whether to reallocate the service request to a second service provider based on the route information;

in response to the determination of reallocating the service request to the second service provider:

generating a second service order reallocating the service request to the second service provider; and transmitting signals to a terminal of the second service provider, the signals prompting the terminal of the second service provider to display information associated with the second service order, wherein the determining whether to reallocate the service request to a second service provider based on the route information includes:

determining a first distance between the second location of the first service provider at the second moment and the pick-up location based on the route information; and comparing the first distance with a second threshold distance, the second threshold distance being no less than the first threshold distance.

10. The method of claim 9, wherein the method further comprising:

in response to the determination of reallocating the service request to the second service provider, transmitting signals to the terminal of the service requester prompting the terminal of the service requester to display information indicating reallocation of the first service order.

11. The method of claim 9, wherein the method further comprising:

in response to the determination of reallocating the service request to the second service provider, transmitting signals to the terminal of the first service provider prompting the terminal of the first service provider to display information indicating reallocation of the first service order.

12. The method of claim 9, wherein if the first distance is greater than the second threshold distance, determining to reallocate the service request to the second service provider; and if the first distance is equal to or less than the second threshold distance, determining not to reallocate the service request to the second service provider.

13. The method of claim 9, wherein the determining whether to reallocate the service request to a second service provider based on the route information includes:

determining a second distance that the first service provider moves from the first moment to the second moment;

determining a ratio of the second distance to a distance between a third location of the first service provider at the first moment and the pick-up location, the third location of the first service provider at the first moment indicating a relatively correct location where the first service provider at the first moment is;

determining to reallocate the service request to the second service provider if the determined ratio is equal to or less than a threshold value; and determining not to reallocate the service request to the second service provider if the determined ratio is greater than the threshold value.

14. The method of claim 13, wherein the third location of the first service provider at the first moment is determined based on the second location of the first service provider at the second moment and the second distance.

15. The method of claim 9, wherein the generating the first service order includes:

searching one or more candidate service providers within the first threshold distance from the pick-up location;

determining a route from a location of each of the one or more candidate service providers to the pick-up location;

selecting the first service provider who has the route which is the shortest; and allocating the service request to the first service provider.

16. The method of claim 9, wherein the generating the second service order includes:

searching one or more candidate service providers within the second threshold distance from the pick-up location of the service requester;

determining a route from a location of each of the one or more candidate service providers to the pick-up location;

selecting the second service provider who has the route that is the shortest; and reallocating the service request to the second service provider.

17. A non-transitory computer readable medium, comprising at least one set of instructions for allocating a service request for an online to offline service, wherein when executed by at least one processor of a computing device, the at least one set of instructions causes the computing device to perform a method, the method comprising:

receiving a service request from a terminal of a service requester, the service request being for a transport service and including a pick-up location and a drop-off location;

in response to the received service request:

determining a first service provider to provide the transport service, the first service provider having a first location at a first moment within a first threshold distance from the pick-up location;

generating a first service order allocating the service request to the first service provider;

receiving, from a terminal of the first service provider, a request for navigation associated with the first service order at a second moment;

in response to the request for the navigation:

generating route information based on a second location of the first service provider at the second moment and the pick-up location;

determining whether to reallocate the service request to a second service provider based on the route information;

in response to the determination of reallocating the service request to the second service provider:

generating a second service order reallocating the service request to the second service provider; and transmitting signals to a terminal of the second service provider, the signals prompting the terminal of the second service provider to display information associated with the second service order, wherein the determining whether to reallocate the service request to a second service provider based on the route information includes:

determining a first distance between the second location of the first service provider at the second moment and the pick-up location based on the route information; and comparing the first distance with a second threshold distance, the second threshold distance being no less than the first threshold distance.

18. The non-transitory computer readable medium of claim 17, wherein the at least one set of instructions further causes the computing device to:

in response to the determination of reallocating the service request to the second service provider, transmit signals to the terminal of the service requester prompting the terminal of the service requester to display information indicating reallocation of the first service order.

* * * * *